(12) United States Patent
Hwang et al.

(10) Patent No.: US 8,919,317 B2
(45) Date of Patent: Dec. 30, 2014

(54) INERTIA INCREMENTAL APPARATUS FOR FLYWHEEL OF ENGINE

(71) Applicant: Hyundai Motor Company, Seoul (KR)

(72) Inventors: Jae Woong Hwang, Yongin-si (KR); Yong Wook Jin, Suwon-si (KR); Wan Soo Oh, Yongi-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/663,891

(22) Filed: Oct. 30, 2012

(65) Prior Publication Data

US 2013/0255618 A1    Oct. 3, 2013

(30) Foreign Application Priority Data

Mar. 27, 2012   (KR) .................. 10-2012-0030890

(51) Int. Cl.
*F02B 75/06*   (2006.01)

(52) U.S. Cl.
USPC ........................................ 123/192.1

(58) Field of Classification Search
USPC ........................................ 123/192.1
See application file for complete search history.

(56) References Cited

U.S. PATENT DOCUMENTS

| 4,422,535 | A | * | 12/1983 | Ling | 192/3.28 |
|---|---|---|---|---|---|
| 4,468,207 | A | * | 8/1984 | Yoshida | 464/68.1 |
| 4,573,374 | A | | 3/1986 | Koshimo et al. | |
| 5,551,928 | A | * | 9/1996 | Sudau | 475/347 |
| 5,570,615 | A | * | 11/1996 | Westphal et al. | 192/213.3 |
| 5,720,248 | A | * | 2/1998 | Crofts | 123/192.1 |
| 5,766,109 | A | | 6/1998 | Sadau | |
| 5,836,216 | A | * | 11/1998 | Sudau et al. | 74/433.5 |
| 7,261,667 | B2 | * | 8/2007 | Berger | 475/347 |
| 7,452,305 | B2 | * | 11/2008 | Oliver et al. | 475/331 |
| 8,672,802 | B2 | | 3/2014 | Hwang et al. | |
| 2009/0221395 | A1 | * | 9/2009 | Hiramatsu | 475/276 |

FOREIGN PATENT DOCUMENTS

| JP | 55-169723 U | 12/1980 |
|---|---|---|
| JP | 2000-130508 A | 5/2000 |
| JP | 2010-164125 A | 7/2010 |
| KR | 10-2006-0130145 A | 12/2006 |

* cited by examiner

*Primary Examiner* — Lindsay Low
*Assistant Examiner* — Charles Brauch
(74) *Attorney, Agent, or Firm* — Morgan, Lewis & Bockius LLP

(57) ABSTRACT

An inertia incremental apparatus for a flywheel of an engine, may include a drive plate integrally connected to a crankshaft, a flywheel rotatably connected to the camshaft, receiving a rotational force from the drive plate through a planetary gear set, and rotating relatively to the crankshaft, and a stiffness-providing unit disposed on a path of transmitting the rotational force from the drive plate to the flywheel.

11 Claims, 3 Drawing Sheets

INERTIA INCREMENTAL APPARATUS FOR FLYWHEEL OF ENGINE

CROSS-REFERENCE TO RELATED APPLICATION

The present application claims priority to Korean Patent Application No. 10-2012-0030890, filed on Mar. 27, 2012, the entire contents of which is incorporated herein for all purposes by this reference.

BACKGROUND OF THE INVENTION

1. Field of the Invention

The present disclosure relates to a technology that improves silence of an engine by increasing the inertial of the engine flywheel. More particularly, it relates to a technology that improves the NVH (Noise, Vibration, and Harshness) characteristic of the engine and the driving system in a vehicle by changing not only the inertial, but the stiffness of a flywheel.

2. Description of Related Art

An engine rotates a crankshaft, using power generated in the explosion stroke and the explosion stroke is not continuous, such that torsional vibration is generated in the crankshaft by the continual power stroke and the rotational vibration is not preferable for continuously driving a vehicle; therefore, the crankshaft is equipped with a flywheel that supplies relatively large rotational inertia to attenuate or reduce rotational vibration due to the operation of the engine.

Therefore, since a larger inertia of the flywheel is advantageous in terms of only rotational vibration and the NVH of the driving system of a vehicle and increases with the weight and the volume, it is necessary to increase the size and the weight of the flywheel as large as possible, but there is a limit in increasing the inertia by increasing the weight and the volume of the flywheel, considering the relationship of the weight and the fuel efficiency of a vehicle and convenience in mounting the flywheel.

Meanwhile, the stiffness between the crankshaft and the flywheel depends on the material and the dimensions of the crankshaft and the flywheel and the material and the dimensions of the crankshaft and the flywheel generally depends on the strength, weight, and volume in the related art; therefore, it is substantially impossible to adjust the stiffness between the crankshaft and the flywheel in order for the NVH characteristic in the related art.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an inertial incremental apparatus for a flywheel of an engine that can greatly improve the NVH performance of the driving system in a vehicle, in addition to rotational vibration generated by the crankshaft of an engine, and can silent and stable operability and riding comfort of the vehicle, by having small volume and weight, largely increasing the inertia of an engine flywheel, and making it possible to adjust the stiffness between the crankshaft and the flywheel.

In an aspect of the present invention, an inertia incremental apparatus for a flywheel of an engine, may include a drive plate integrally connected to a crankshaft, a flywheel rotatably connected to the crankshaft, receiving a rotational force from the drive plate through a planetary gear set, and rotating relatively to the crankshaft, and a stiffness-providing unit disposed on a path of transmitting the rotational force from the drive plate to the flywheel.

The planetary gear set may include three rotary elements of a first rotary element connected to the drive plate, a second rotary element connected to the flywheel, and a third rotary element restricted in rotation so that the second rotary element connected to the flywheel increases in speed with respect to the first rotary element connected to the drive plate.

The stiffness-providing unit may include an elastic member that elastically extends or retracts with respect to relative rotation of two rotary elements out of the three rotary elements, wherein the two rotary elements are disposed to be rotatable relatively to each other.

The first, second, and third rotary elements are a carrier, a ring gear, and a sun gear of the planetary gear set, respectively.

The first, second, and third rotary elements are a carrier, a sun gear, and a ring gear of the planetary gear set, respectively It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
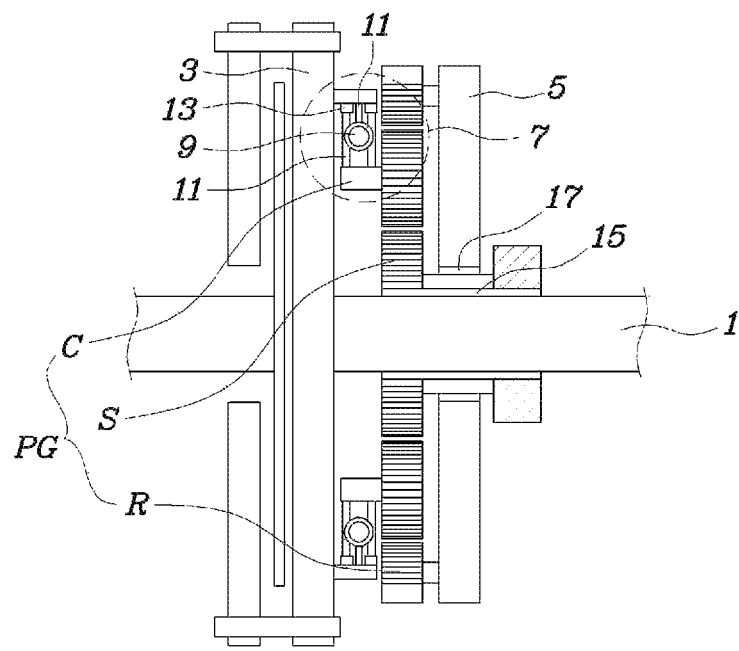
FIG. 1 is a view showing various exemplary embodiments of an inertia incremental apparatus for a flywheel of an engine according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter reference will now be made in detail to various embodiments of the present invention, examples of which are illustrated in the accompanying drawings and described below.

Referring to FIGS. 1 to 6, inertia incremental apparatuses for an engine according to embodiments of the present invention all includes: a drive plate 3 integrally connected to a crankshaft 1, a flywheel 5 connected to receive a rotational force from the drive plate 3 through a planetary gear set PG and rotating relatively to the crankshaft 1, and a stiffness-providing unit 7 disposed on the path of transmitting a rotational force for the drive plate 3 and the flywheel 5.

That is, a configuration that can increase a rotational force from the crankshaft 1 with the planetary gear set PG and transmits the rotational force to the flywheel 5 so that the fly wheel 5 can provide the increased inertia to the crankshaft 1 and the stiffness between the crankshaft 1 and the flywheel 5 can be optimized for the NVH performance of the engine and the driving system in a vehicle and then provided by the stiffness-providing unit 7 disposed on the transmission path of a rotational force for the drive plate 3 and the flywheel 5.

The planetary gear set PG includes three rotary elements of a rotary element connected to the drive plate 3, a rotary element connected to the flywheel 5, and a rotary element restricted in rotation so that the rotary element connected to the flywheel 5 increases in speed with respect to the rotary element connected to the drive plate 3.

Figure 2:
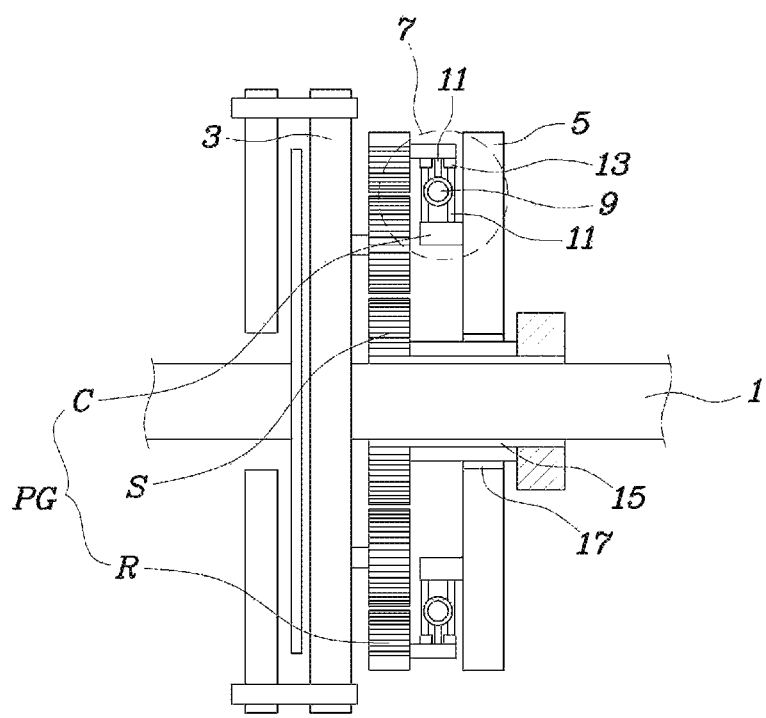
FIG. 2 is a view showing various exemplary embodiments of an inertia incremental apparatus for a flywheel of an engine according to an exemplary embodiment of the present invention.
Figure 3:
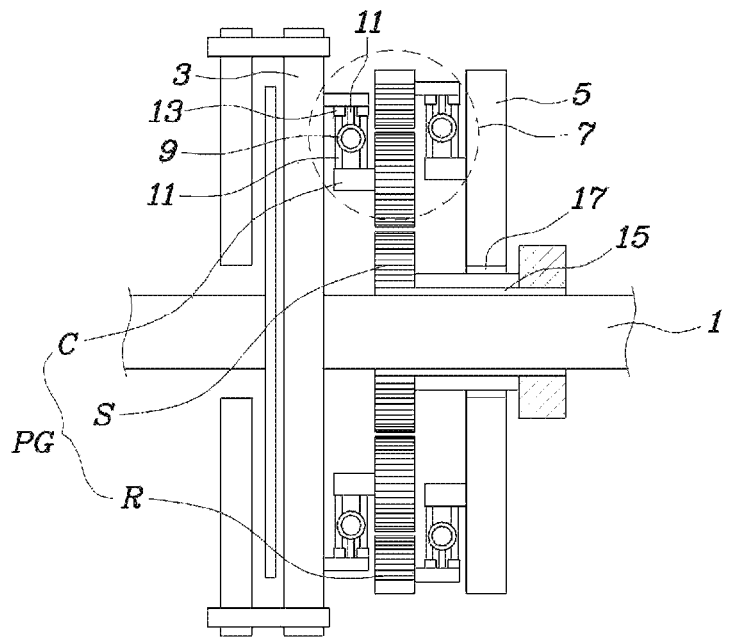
FIG. 3 is a view showing various exemplary embodiments of an inertia incremental apparatus for a flywheel of an engine according to an exemplary embodiment of the present invention.

That is, according to the first embodiment to the third embodiment shown in FIGS. 1 to 3, a carrier C of the planetary gear set PG is connected to the drive plate 3, a ring gear R is connected to the flywheel 5, and a sun gear S is fixed so that as power inputted to the carrier C increases through the ring gear R, the fly wheel 5 can provide the increased inertia to the crankshaft 1 while being increased in speed and rotated by power supplied through the drive plate 3.

Figure 4:
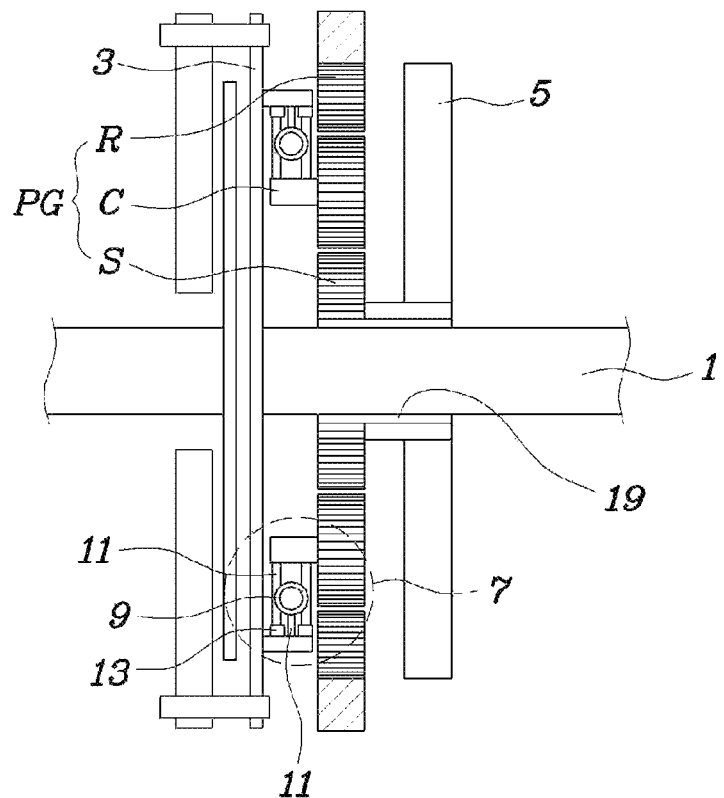
FIG. 4 is a view showing various exemplary embodiments of an inertia incremental apparatus for a flywheel of an engine according to an exemplary embodiment of the present invention.
Figure 5:
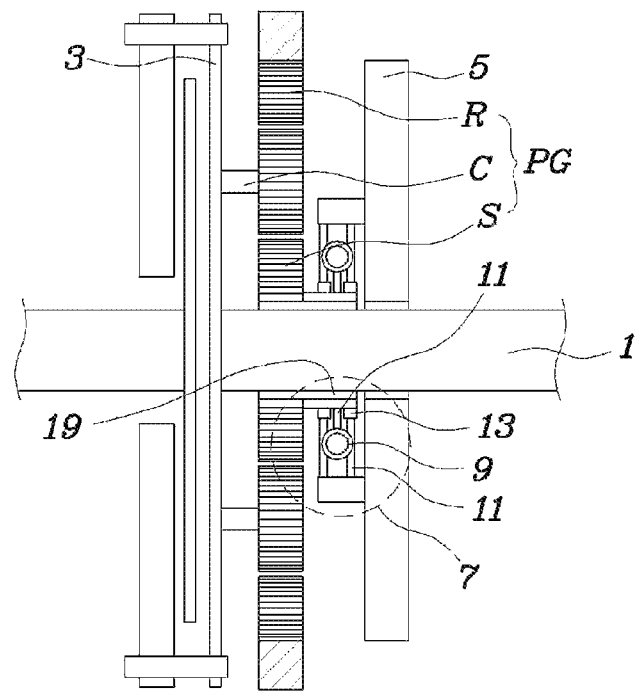
FIG. 5 is a view showing various exemplary embodiments of an inertia incremental apparatus for a flywheel of an engine according to an exemplary embodiment of the present invention.
Figure 6:
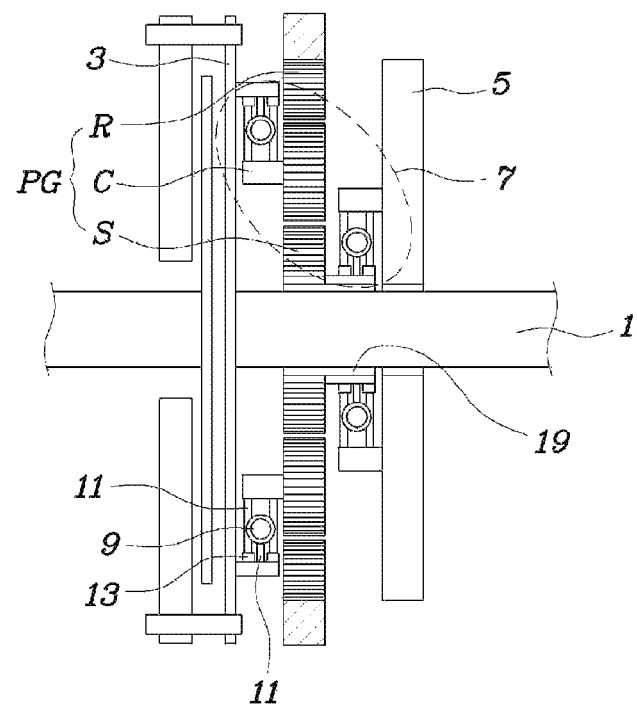
FIG. 6 is a view showing various exemplary embodiments of an inertia incremental apparatus for a flywheel of an engine according to an exemplary embodiment of the present invention.

Further, according to the fourth embodiment to the sixth embodiment shown in FIGS. 4 to 6, a carrier C of the planetary gear set PG is connected to the drive plate 3, a sun gear S is connected to the flywheel 5, and a ring gear R is fixed, such that as power inputted to the carrier C increases through the sun gear S, the fly wheel 5 can provide the increased inertia while being increased in speed and rotated by power supplied through the drive plate 3.

The stiffness-providing unit 7 includes an elastic member 9 that can elastically extend/retract with respect to relative rotation of two rotary bodies that are disposed to be rotatable relatively to each other on the transmission path of a rotational force for the drive plate 3 and the flywheel 5.

That is, in the stiffness-providing unit 7, two adjacent rotary bodies on the transmission path in the rotary bodies on the transmission path of a rotational force for the drive plate 3 and the flywheel 5 are disposed to be rotatable relatively to each other and the elastic member 9 is disposed between the two rotary bodies.

Obviously, it is preferable that the stiffness-providing unit 7 has support potions 11 for the two rotary bodies to support both ends of the elastic member 9, in which support portions 11 protruding radially outward and inward from two opposite rotary bodies in the exemplary embodiments of FIGS. 1 to 6 support both ends of a coil spring, which is the elastic member 9.

Meanwhile, a guide bearing 13 that guides relative rotation of two rotary bodies is disposed between the two rotary bodies that receive an elastic force from the elastic member 9 to be rotatable relatively to each other, such that it can guide smooth relative rotation between the two rotary bodies.

The configurations of the exemplary embodiments shown in FIGS. 1 to 6 are described in detail hereafter. According to the first embodiment shown in FIG. 1, a carrier C of the planetary gear set PG is connected to the drive plate 3, a ring gear R is connected to the flywheel 5, a sun gear S is restricted in rotation, and the stiffness-providing unit 7 is disposed between the drive plate 3 and the carrier C.

According to the second embodiment shown in FIG. 2, a carrier C of the planetary gear set PG is connected to the drive plate 3, a ring gear R is connected to the flywheel 5, a sun gear S is restricted in rotation, and the stiffness-providing unit 7 is disposed between the ring gear R and the flywheel 5.

According to the third embodiment shown in FIG. 3, a carrier C of the planetary gear set PG is connected to the drive plate 3, a ring gear R is connected to the flywheel 5, a sun gear S is restricted in rotation, and the stiffness-providing unit 7 is disposed between the drive plate 3 and the carrier C and between the ring gear R and the flywheel 5.

According to the fourth embodiment shown in FIG. 4, a carrier C of the planetary gear set PG is connected to the drive plate 3, a sun gear S is connected to the flywheel 5, a ring gear R is restricted in rotation, and the stiffness-providing unit 7 is disposed between the drive plate 3 and the carrier C.

According to the fifth embodiment shown in FIG. 5, a carrier C of the planetary gear set PG is connected to the drive plate 3, a sun gear S is connected to the flywheel 5, a ring gear R is restricted in rotation, and the stiffness-providing unit 7 is disposed between the sun gear S and the flywheel 5.

According to the sixth embodiment shown in FIG. 6, a carrier C of the planetary gear set PG is connected to the drive plate 3, a sun gear S is connected to the flywheel 5, a ring gear R is restricted in rotation, and the stiffness-providing unit 7 is disposed between the drive plate 3 and the carrier C and between the sun gear S and the flywheel 5.

For reference, in FIGS. 1 to 3, the sun gear S is mounted on the outer side of the crankshaft 1 by a first support bearing 15, and allows relative rotation of the crankshaft 1 and is stably fixed to an engine block, and the flywheel 5 is supported to the outer side of the sun gear S by a second support bearing 17, such that stable rotation can be ensured.

Further, in FIGS. 4 to 6, the sun gear S with the flywheel 5 connected to the outer side is supported to the outer side of the crankshaft 1 by a third support bearing 19 to be rotatable relatively to the crankshaft 1 while stably maintaining the rotation.

Obviously, the first support bearing 15, second support bearing 17, third support bearing 19, and guide bearing 13 may be replaced by bushes of which lubrication is appropriately ensured.

In all the first embodiment to the sixth embodiment described above, the power from the engine crankshaft 1 is supplied to the carrier C of the planetary gear set PG through the drive plate 3, the sun gear S or the ring gear R is fixed to increase the power, and the flywheel 5 is rotated at the increased speed, such that it is possible to provide the crankshaft 1 and the power transmission system of the vehicle with inertia considerably increased in comparison to the flywheel 5 simply and directly connected to the crankshaft in the related art, considering the same weight and volume, and the stiffness-providing unit 7 disposed on the transmission path of power between the drive plate 3 and the flywheel 5 can provide appropriate necessary stiffness to the power transmission system of the vehicle including an engine and a transmission in the operation described above, which largely contributes to improving the NVH performance of the vehicle.

That is, according to the exemplary embodiment described above, it is possible to tune the inertia and stiffness of the power transmission system of a vehicle including an engine and a transmission into an optimum state by using the planetary gear set PG and the stiffness-providing unit 7 disposed on the transmission path of power, such that it is possible to implement more silent and stable driving state of the vehicle.

The present invention provides an inertial incremental apparatus for a flywheel of an engine that can greatly improve the NVH performance of the driving system in a vehicle, in addition to rotational vibration generated by the crankshaft of an engine, and can silent and stable operability and riding comfort of the vehicle, by having small volume and weight, largely increasing the inertia of an engine flywheel, and making it possible to adjust the stiffness between the crankshaft and the flywheel.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An inertia incremental apparatus for a flywheel of an engine, comprising:
    a drive plate integrally connected to a crankshaft;
    a flywheel rotatably connected to the crankshaft via a planetary gear set, receiving a rotational force from the drive plate through the planetary gear set, and rotating relatively to the crankshaft; and
    a stiffness-providing unit disposed on a path of transmitting the rotational force between the drive plate and the flywheel;
    wherein the planetary gear set operably disposed between the drive plate and the flywheel including a first rotary element connected to the drive plate, a second rotary element connected to the flywheel, and a third rotary element which is continuously stationary, wherein the second rotary element connected to the flywheel increases in speed with respect to the first rotary element connected to the drive plate; and
    wherein the stiffness-providing unit includes an elastic member that elastically extends or retracts with respect to relative rotation of two rotary elements out of the three rotary elements to adjust the stiffness between the crankshaft and the flywheel, wherein the two rotary elements are disposed to be rotatable relatively to each other.

2. The apparatus of claim 1, wherein the stiffness-providing unit has support portions for the two rotary elements to support both ends of the elastic member.

3. The apparatus of claim 1, further comprising a guide bearing that guides relative rotation of the two rotary elements, the guide bearing being disposed between the two rotary elements that receive an elastic force from the elastic member to be rotatable relatively to each other.

4. The apparatus of claim 1, wherein the first, second, and third rotary elements are a carrier, a ring gear, and a sun gear of the planetary gear set, respectively.

5. The apparatus of claim 4, wherein the carrier of the planetary gear set is connected to the drive plate, the ring gear is connected to the flywheel, the sun gear is restricted in rotation, and the stiffness-providing unit is disposed between the drive plate and the carrier.

6. The apparatus of claim 4, wherein the carrier of the planetary gear set is connected to the drive plate, the ring gear is connected to the flywheel, the sun gear is restricted in rotation, and the stiffness-providing unit is disposed between the ring gear and the flywheel.

7. The apparatus of claim 4, wherein the carrier of the planetary gear set is connected to the drive plate, the ring gear is connected to the flywheel, the sun gear is restricted in rotation, and the stiffness-providing unit is disposed between the drive plate and the carrier and between the ring gear and the flywheel.

8. The apparatus of claim 1, wherein the first, second, and third rotary elements are a carrier, a sun gear, and a ring gear of the planetary gear set, respectively.

9. The apparatus of claim 8, wherein the carrier of the planetary gear set is connected to the drive plate, the sun gear is connected to the flywheel, the ring gear is restricted in rotation, and the stiffness-providing unit is disposed between the drive plate and the carrier.

10. The apparatus of claim 8, wherein the carrier of the planetary gear set is connected to the drive plate, the sun gear is connected to the flywheel, the ring gear is restricted in rotation, and the stiffness-providing unit is disposed between the sun gear and the flywheel.

11. The apparatus of claim 8, wherein the carrier of the planetary gear set is connected to the drive plate, the sun gear is connected to the flywheel, the ring gear is restricted in rotation, a first stiffness-providing unit is disposed between the drive plate and the carrier, and a second stiffness-providing unit is disposed between the sun gear and the flywheel.

* * * * *